United States Patent
Chen

(10) Patent No.: US 12,509,181 B2
(45) Date of Patent: Dec. 30, 2025

(54) BICYCLE PEDAL

(71) Applicant: WELLGO PEDAL'S CORP., Taichung (TW)

(72) Inventor: Chun-Rong Chen, Taichung (TW)

(73) Assignee: WELLGO PEDAL'S CORP., Taichung (TW)

(*) Notice: Subject to any disclaimer, the term of this patent is extended or adjusted under 35 U.S.C. 154(b) by 16 days.

(21) Appl. No.: 18/734,218

(22) Filed: Jun. 5, 2024

(65) Prior Publication Data

US 2025/0376240 A1  Dec. 11, 2025

(51) Int. Cl.
*B62M 3/08* (2006.01)

(52) U.S. Cl.
CPC .................... *B62M 3/086* (2013.01)

(58) Field of Classification Search
CPC .................................................. B62M 3/086
See application file for complete search history.

(56) References Cited

U.S. PATENT DOCUMENTS

| 2004/0187636 A1* | 9/2004 | Hsiao | B62M 3/086 |
|---|---|---|---|
| | | | 74/594.6 |
| 2017/0066499 A1* | 3/2017 | Yang | B62M 3/086 |

FOREIGN PATENT DOCUMENTS

| CN | 102039978 A | * | 5/2011 | ............ | B62M 3/086 |
|---|---|---|---|---|---|
| TW | 503201 B | | 9/2002 | | |
| TW | I474949 B | | 3/2015 | | |

* cited by examiner

*Primary Examiner* — Vicky A Johnson
(74) *Attorney, Agent, or Firm* — Muncy, Geissler, Olds & Lowe, P.C.

(57) ABSTRACT

A bicycle pedal is provided, wherein the bicycle pedal includes: a pedal body including a mounting surface and a first shoulder opposite to the mounting surface; a first cleat securing member including a transverse portion detachably secured to the mounting surface, and a projection portion transversely extending from the transverse portion, the projection portion including a second shoulder abutted against the first shoulder; a second cleat securing member; a shaft connected to the projection portion and the second cleat securing member such that the second cleat securing member is rotatable relative to the first cleat securing member; and a biasing mechanism disposed between the first cleat securing member and the second cleat securing member, and biasing the second cleat securing member.

10 Claims, 6 Drawing Sheets

BICYCLE PEDAL

BACKGROUND OF THE INVENTION

Field of the Invention

The present invention relates to a bicycle pedal.

Description of the Prior Art

A clipless pedal of a bicycle includes a fixed cleat securing member and a movable cleat securing member oppositely mounted on a pedal body, for releasably securing a cleat of a shoe, so that the cyclist's foot can be held on the bicycle pedal. Compared to the bicycle pedal without securing mechanism, it is labor-saving, good in acceleration with the clipless pedal. As a result, mountain bikes, road bikes, off-road bikes or race bikes are usually equipped with clipless pedals.

Generally, the movable cleat securing member can be adjusted, through a biasing mechanism, to vary tightness of securing the cleat. This type of clipless pedal is disclosed in TW 1474949 and TW 503201. However, in this type of clipless pedal, the biasing mechanism is mounted directly to the movable cleat securing member. Since the biasing mechanism of the conventional bicycle pedal is directly connected to the pedal body, so it is not easy to assemble, disassemble, maintain or replace, especially for ordinary users.

The present invention is, therefore, arisen to obviate or at least mitigate the above-mentioned disadvantages.

SUMMARY OF THE INVENTION

The main object of the present invention is to provide a bicycle pedal which is easy to assemble, disassemble, replace and maintain.

To achieve the above and other objects, the present invention provides a bicycle pedal is provided, wherein the bicycle pedal includes: a pedal body including a mounting surface and a first shoulder opposite to the mounting surface; a first cleat securing member including a transverse portion detachably secured to the mounting surface, and a projection portion transversely extending from the transverse portion, the projection portion including a second shoulder abutted against the first shoulder; a second cleat securing member; a shaft connected to the projection portion and the second cleat securing member such that the second cleat securing member is rotatable relative to the first cleat securing member; and a biasing mechanism disposed between the first cleat securing member and the second cleat securing member, and biasing the second cleat securing member.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
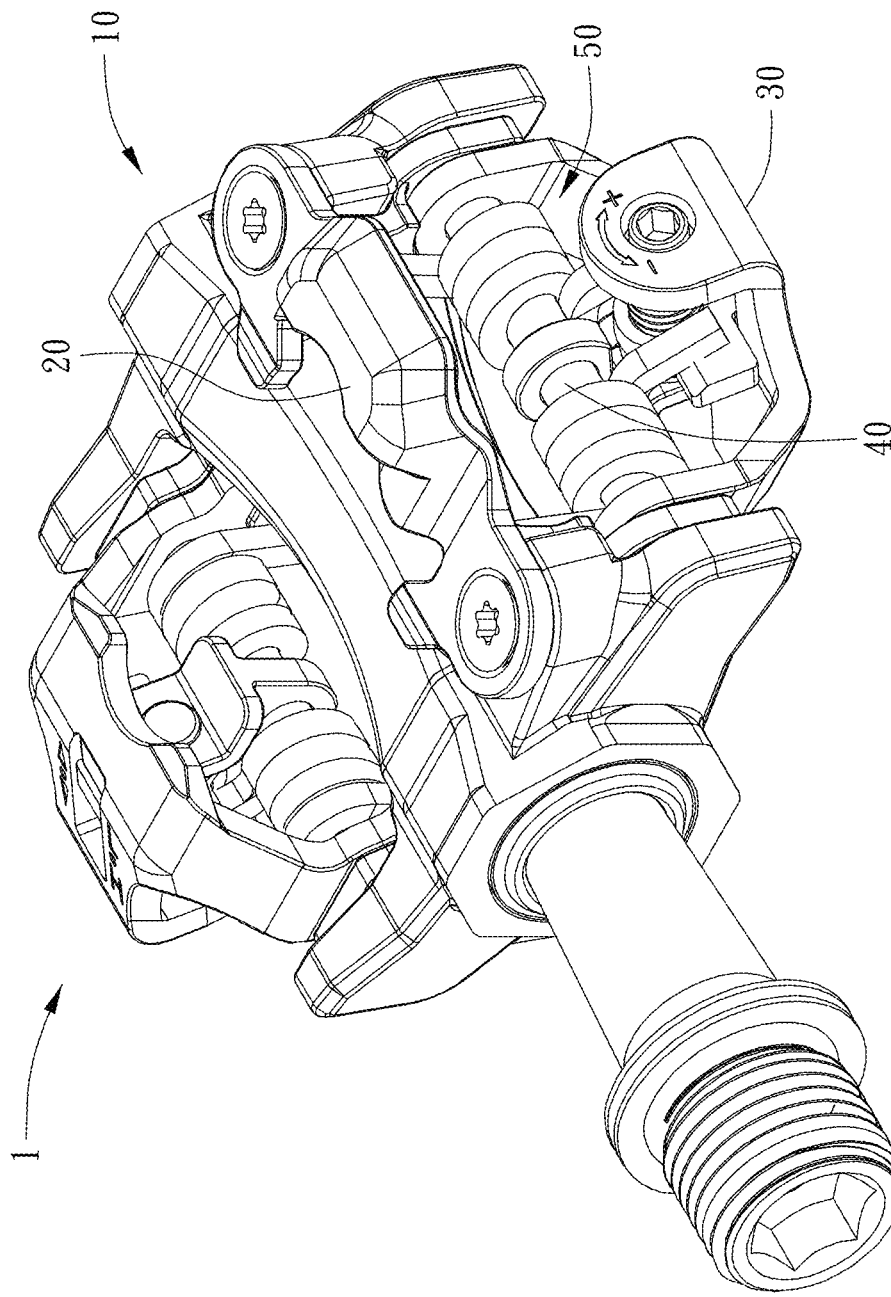
FIG. 1 is a stereogram of an exemplary embodiment of the present invention.
Figure 2:
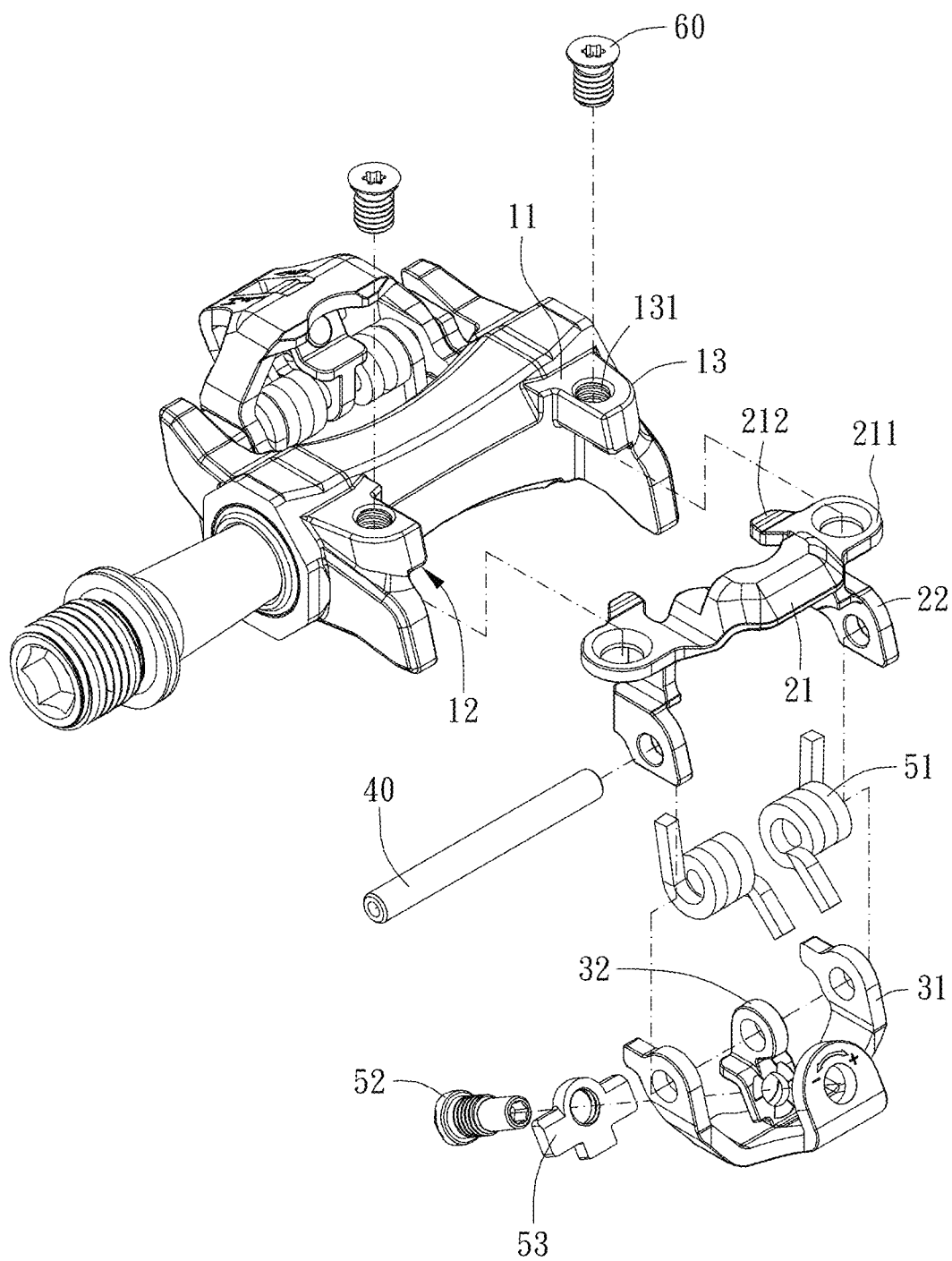
FIG. 2 is a breakdown drawing of an exemplary embodiment of the present invention.
Figure 3:
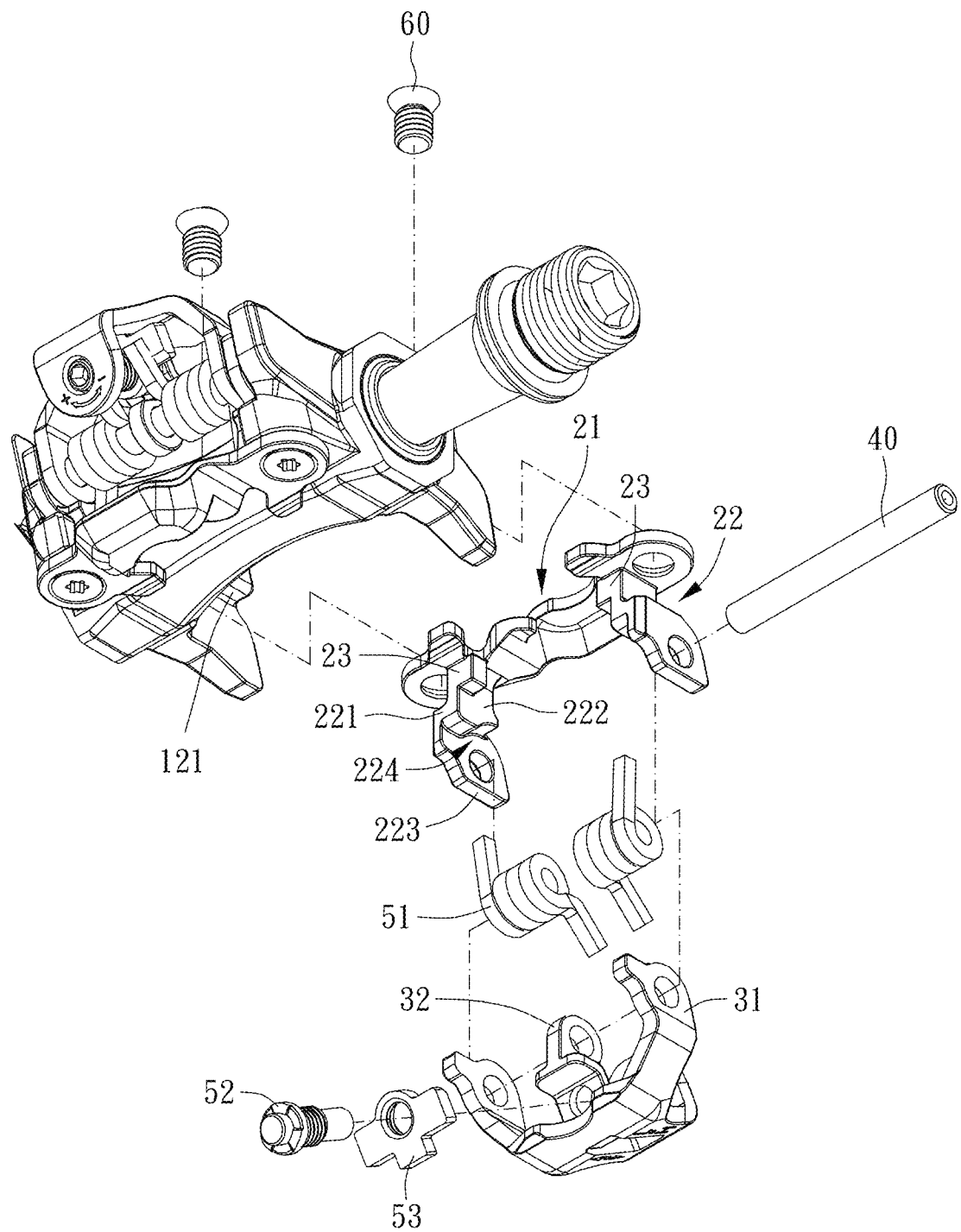
FIG. 3 is another breakdown drawing of an exemplary embodiment of the present invention.
Figure 4:
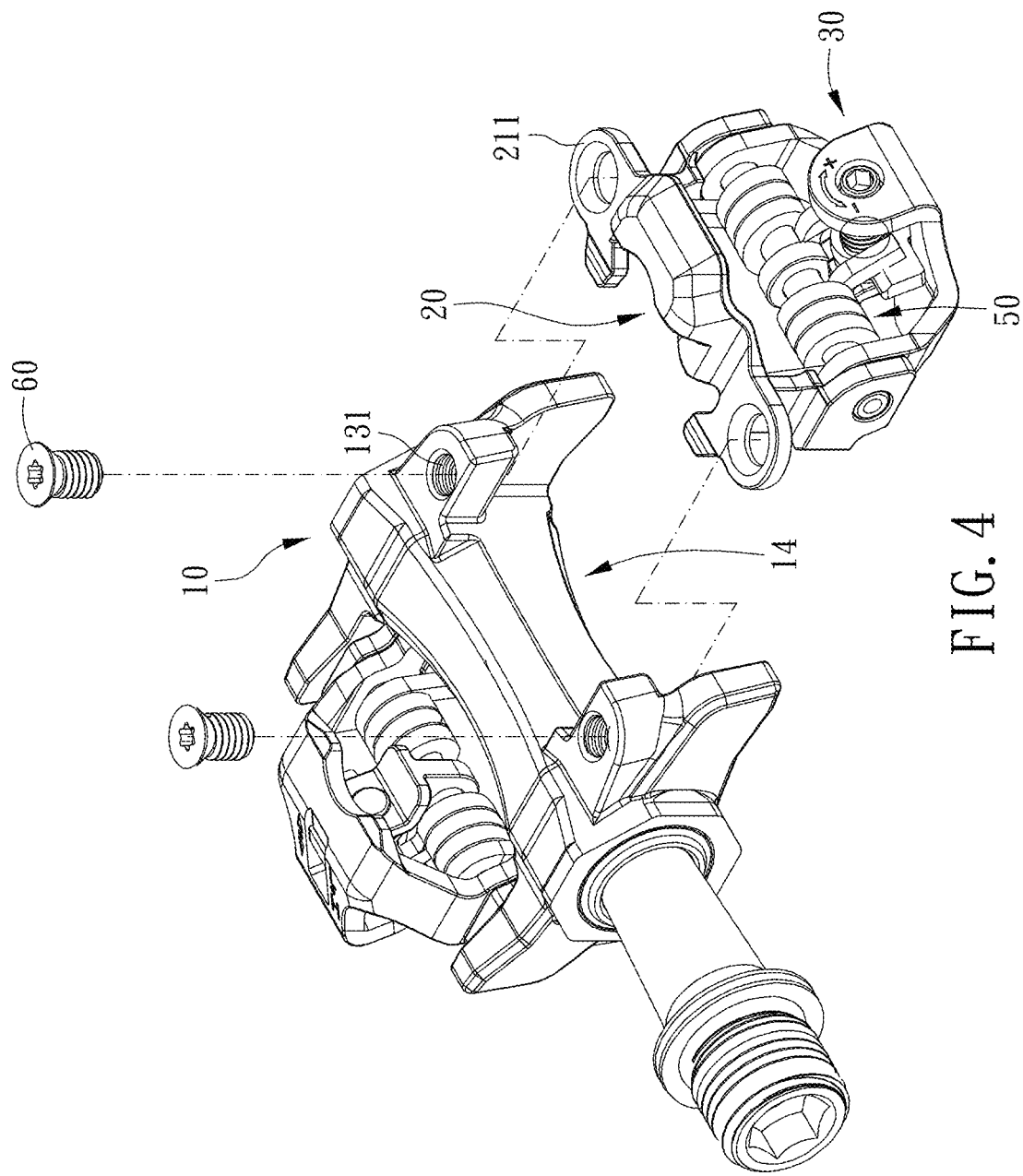
FIG. 4 is a partial breakdown drawing of FIG. 1.
Figure 5:
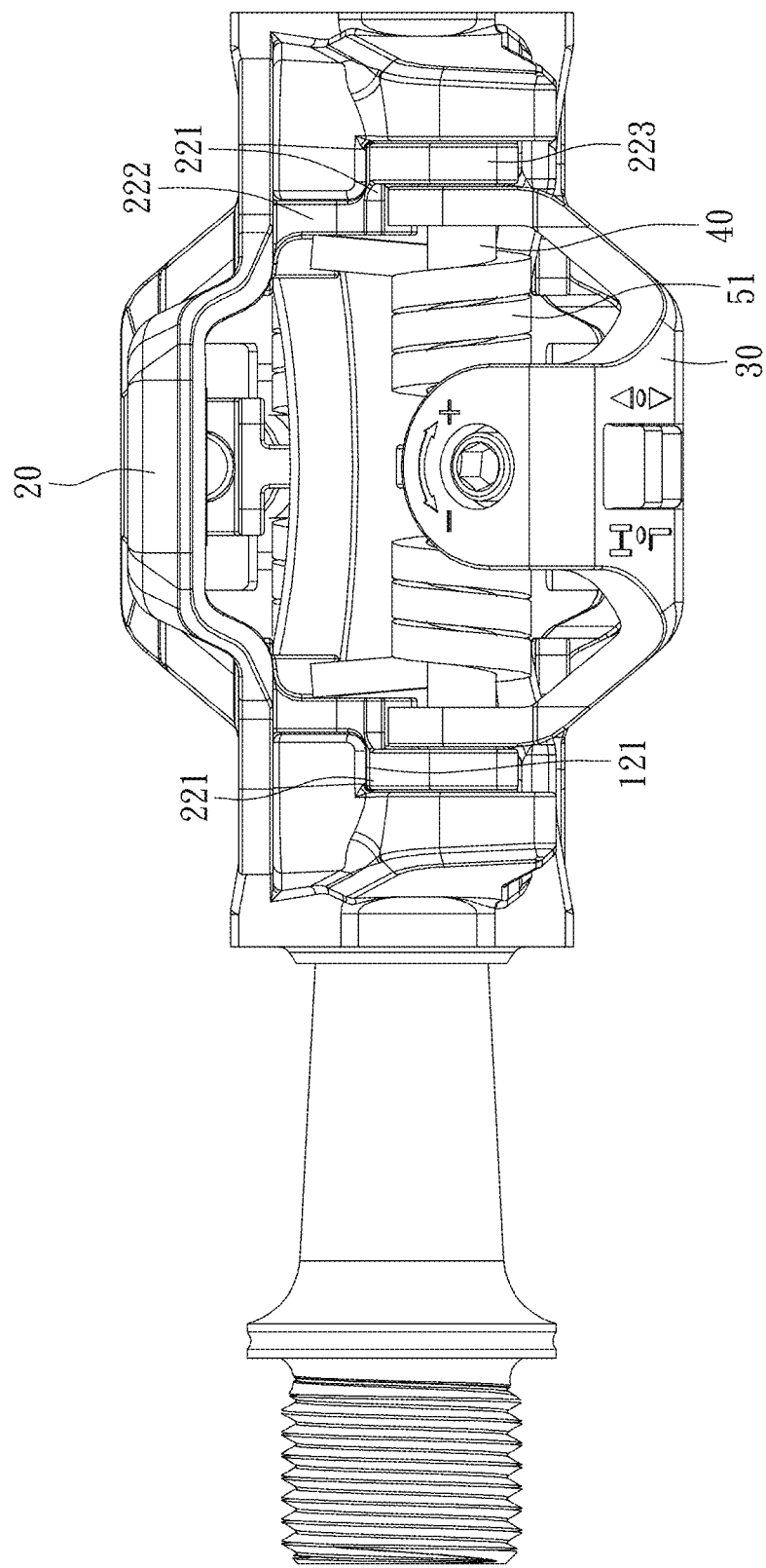
FIG. 5 is a side view of FIG. 1.
Figure 6:
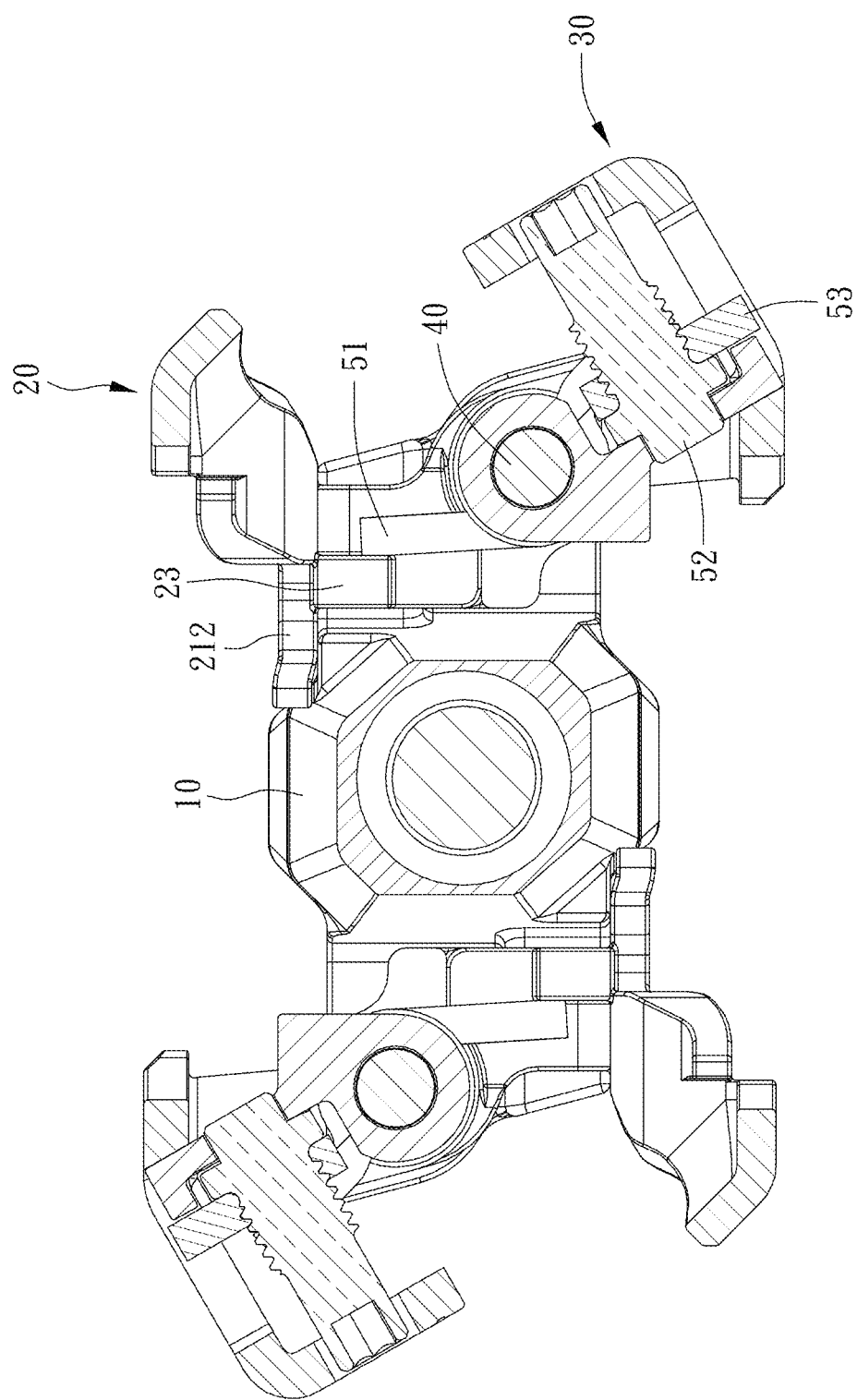
FIG. 6 is a cross-sectional view of an exemplary embodiment of the present invention.

Please refer to FIGS. 1 to 6 for an exemplary embodiment of the present invention. A bicycle pedal 1 of the present invention includes a pedal body 10, a first cleat securing member 20, a second cleat securing member 30, a shaft 40 and a biasing mechanism 50.

The pedal body 10 includes a mounting surface 11 and a first shoulder 12 opposite to the mounting surface 11. The first cleat securing member 20 includes a transverse portion 21 detachably secured to the mounting surface 11, and a projection portion 22 transversely extending from the transverse portion 21, the projection portion 22 includes a second shoulder 221 abutted against the first shoulder 12. The shaft 40 is connected to the projection portion 22 and the second cleat securing member 30 such that the second cleat securing member 30 is rotatable relative to the first cleat securing member 20. The biasing mechanism 50 is disposed between the first cleat securing member 20 and the second cleat securing member 30, and biases the second cleat securing member 30. As such, the sellers, manufacturers or general users only need to disengage the first cleat securing member 20 and the pedal body 10 for easily and conveniently assembling, disassembling or replacing the first cleat securing member 20, the second cleat securing member 30 and the biasing mechanism 50. Opposing sides of the pedal body 10 may be provided with a pair of the first cleat securing member 20 and the second cleat securing member 30, and in the same side of the pedal body 10 the first cleat securing member 20 and the second cleat securing member 30 are configured to clamp a cleat of a shoe.

Preferably, the first shoulder 12 and the second shoulder 221 are parallel to the mounting surface 11, the first cleat securing member 20 is inserted into the pedal body 10 with the second shoulder 221 sliding along the first shoulder 12, and a portion of the pedal body 10 is engaged between the transverse portion 21 and the second shoulder 221 so that it is easy to assemble the first cleat securing member 20 and so that the first cleat securing member 20 can be effectively and reliably blocked. The pedal body 10 further includes two protrusions 13, each of the two protrusions 13 includes a connection structure 131 (such as threaded hole), the first shoulder 12 includes two first abutting surfaces 121, two sides of each of the two protrusions 13 each include one of the two first abutting surfaces 121 and one said connection structure 131, the transverse portion 21 includes two first flanges 211, each of the two first flanges 211 is detachably secured (through screws 60, for example) to one said connection structure 131, which is easy to assemble, disassemble, replace and maintain. The transverse portion 21 further includes two second flanges 212, and the two second flanges 212 respectively extend radially from the two first flanges 211 and connected to the projection portion 22, which provides large structural strength and combined reliability of the transverse portion 21.

In this embodiment, the projection portion 22 further includes two first sections 222 extending from the transverse portion 21, and two second sections 223, the second shoulder 221 are transversely connected to and between the two first sections 222 and the two second sections 223, and the shaft 40 is inserted in the two second sections 223. Specifically, the second shoulder 221 and each of the two second sections 223 form a space 224 in which one of two first arms 31 of the second cleat securing member 30 is received, which can reduce the overall thickness and contribute to the stable movement of the projection portion 22.

Preferably, a connection portion 23 is connected to and between the transverse portion 21 and the projection portion 22, the connection portion 23 extends perpendicularly relative to the transverse portion 21 and the projection portion 22, and the connection portion 23 is abutted against a side surface of the pedal body 10 connected to the mounting surface 11, which can increase the contact area and stability of the first cleat securing member 20 and the pedal body 10, and strengthen the connection structure strength of the transverse portion 21 and the projection portion 22. The second cleat securing member 30 includes a second arm 32 integrally extending therefrom, and the second arm 32 and the projection portion 22 extend in a same direction and between the two first arms 31, which can improve the pivot strength and stable rotation of the second cleat securing member 30.

The pedal body 10 further includes a recess 14, the shaft 40 is disposed through and axially movable relative to the projection portion 22 and the second cleat securing member 30, and the shaft 40 is restricted by two side walls of the recess 14 so that the projection portion 22 and the second cleat securing member 30 are non-disengageable from the shaft 40. Since the shaft 40 is not inserted in the pedal body 10 and detachably assembled with the first cleat securing member 20 and the second cleat securing member 30, all parts can be easily and conveniently assembled, disassembled or replaced when the first cleat securing member 20 is removed from the pedal body 10.

In this embodiment, the biasing mechanism 50 includes at least one elastic member 51 disposed around the shaft 40, a threaded member 52 movably disposed on the second cleat securing member 30, and an abutting member 53 screwed to and around the threaded member 52, an end of the at least one elastic member 51 is abutted against the abutting member 53, and another end of the at least one elastic member 51 is abutted against the connection portion 23 (or abutted against the pedal body 10). The threaded member 52 rotates to drive the abutting member 53 to adjust the preload of the at least one elastic member 51 to adjust the cleating force of the second cleat securing member 30. Preferably, When the at least one elastic member 51 is not forced, an end surface of the at least one elastic member 51 is in flat contact with the bottom of the groove of the recess 14.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A bicycle pedal including:
   a pedal body including a mounting surface and a first shoulder opposite to the mounting surface, the pedal body further including a recess, the recess being disposed through the pedal body in a thickness direction of the pedal body, the first shoulder facing in the thickness direction of the pedal body;
   a first cleat securing member including a transverse portion detachably secured to the mounting surface, and a projection portion transversely extending from the transverse portion and being received within the recess, the projection portion including a second shoulder abutted against the first shoulder in the thickness direction of the pedal body;
   a second cleat securing member;
   a shaft connected to the projection portion of the first cleat securing member and the second cleat securing member such that the second cleat securing member is rotatable relative to the first cleat securing member; and
   a biasing mechanism disposed between the first cleat securing member and the second cleat securing member, and biasing the second cleat securing member.

2. The bicycle pedal of claim 1, wherein the first shoulder is parallel to the mounting surface.

3. The bicycle pedal of claim 1, wherein the pedal body further includes two protrusions, each of the two protrusions includes a connection structure, the first shoulder includes two first abutting surfaces, two sides of each of the two protrusions each include one of the two first abutting surfaces and one said connection structure, the transverse portion includes two first flanges, and each of the two first flanges is detachably secured to one said connection structure.

4. The bicycle pedal of claim 3, wherein the transverse portion further includes two second flanges, and the two second flanges respectively extend radially from the two first flanges and connected to the projection portion.

5. The bicycle pedal of claim 1, wherein the projection portion further includes two first sections extending from the transverse portion, and two second sections, the second shoulder are transversely connected to and between the two first sections and the two second sections, and the shaft is inserted in the two second sections.

6. The bicycle pedal of claim 5, wherein the second shoulder and each of the two second sections form a space in which one of two first arms of the second cleat securing member is received.

7. The bicycle pedal of claim 1, wherein a connection portion is connected to and between the transverse portion and the projection portion, the connection portion extends perpendicularly relative to the transverse portion and the projection portion, and the connection portion is abutted against a side surface of the pedal body connected to the mounting surface.

8. The bicycle pedal of claim 1, wherein the first cleat securing member is inserted into the pedal body with the second shoulder sliding along the first shoulder, and a portion of the pedal body is engaged between the transverse portion and the second shoulder.

9. The bicycle pedal of claim 1, wherein the second cleat securing member includes a second arm integrally extending therefrom, and the second arm and the projection portion extend in a same direction.

10. The bicycle pedal of claim 1, wherein the shaft is disposed through and axially movable relative to the projection portion and the second cleat securing member, and the shaft is restricted by two side walls of the recess so that the projection portion and the second cleat securing member are non-disengageable from the shaft.

* * * * *